UNITED STATES PATENT OFFICE.

HUGH McDONALD, OF PITTSBURG, PENNSYLVANIA.

IMPROVED FIX FOR PUDDLING-FURNACES.

Specification forming part of Letters Patent No. 50,483, dated October 17, 1865; Reissue No. 2,153, dated January 23, 1866; Reissue No. 2,690, dated July 16, 1867.

*To all whom it may concern:*

Be it known that I, HUGH McDONALD, of Pittsburg, in the county of Allegheny and State of Pennsylvania, have invented a new and useful Improvement in Fix for Puddling or Boiling Furnaces; and I do hereby declare the following to be a full and exact description thereof.

The nature of my improvement consists in using pulverized iron ore as a fixing for puddling or boiling furnaces, said ore being mixed into a pasty mass with water or other suitable liquid and used as a fix for those portions of the furnace which require protection, and so used without previous melting; also, in the use of raw and unmelted iron ore as a fix for puddling or boiling furnaces, said ore being ground or pulverized and mixed with charcoal or other carbonaceous matter and made into an adhesive mass with water or other suitable liquid.

To enable others skilled in the art of puddling or boiling iron to make and use my invention, I will proceed to describe its construction and operation.

In preparing my improved fix I take any good iron ore and pulverize by any suitable means. I then mix it with water, so as to form a pasty or adhesive mass. I then take this mixed mass and, with the ordinary tools used in "fixing" puddling or boiling furnaces, I apply the "fix" to those portions of the furnace which require protection, all of which operation will be readily understood by the skillful puddler or boiler. When I use charcoal or other carbonaceous matter with the iron ore I grind or pulverize said carbonaceous matter and the iron ore together, and then mix this ground or pulverized mass with water or any other suitable liquid, so as to form a pasty or adhesive mass, which mass, when thus prepared, I apply to the furnace in the manner and by the means described, and for the purpose set forth. I do not melt the ore in preparing my improved fix. Hence it can be applied to the furnace when cold or hot, and the furnace is ready for receiving its charge of iron within fifteen minutes after applying the fix to those parts which require it.

The advantages of my improved fix are as follows:

First, I avoid the expense and trouble of melting the ore.

Second, I save the time and cost of fuel consumed in the melting of the ore.

Third, the necessity of using scrap is avoided.

Fourth, more than four-fifths of the time occupied in fixing the furnace by the old and well-known process is saved by the use of my improvement in fix for puddling or boiling furnaces.

I wish it clearly understood that a "cold fix" made of lump iron ore set around in the puddling-furnace has been used for fixing. I am also aware that a cold fix consisting of what is termed "bog ore" has been used for fixing puddling-furnaces. Therefore I wish it clearly understood that I do not claim broadly a cold fix when said fix is formed by setting lump ore around the furnace, or when said fix is formed by the use of bog ore. I desire to confine my invention to the use of iron ore pulverized and treated substantially as hereinbefore described.

Having thus described the nature, construction, and operation of my improvement, what I claim as of my invention is—

1. The use of pulverized iron ore as a fix for puddling or boiling furnaces when mixed into a pasty mass with water or other suitable liquid.

2. Pulverized iron ore combined with carbonaceous matter and made into a pasty or adhesive mass and used as a fixing for puddling or boiling furnaces.

HUGH McDONALD.

Witnesses:

JAMES J. JOHNSTON,

A. C. JOHNSTON.